No. 675,470. Patented June 4, 1901.
J. F. DORNFELD.
MALT HOUSE.
(Application filed July 14, 1900.)
(No Model.)

Witnesses: O. N. Keeney, Anna V. Faust.

Inventor: John F. Dornfeld, By Benedict & Morsell, Attorneys.

THE NORRIS PETERS CO., PHOTO-LITHO., WASHINGTON, D. C.

UNITED STATES PATENT OFFICE.

JOHN F. DORNFELD, OF MILWAUKEE, WISCONSIN.

MALT-HOUSE.

SPECIFICATION forming part of Letters Patent No. 675,470, dated June 4, 1901.

Application filed July 14, 1900. Serial No. 23,589. (No model.)

*To all whom it may concern:*

Be it known that I, JOHN F. DORNFELD, of Milwaukee, in the county of Milwaukee and State of Wisconsin, have invented a new and useful Improvement in Malt-Houses, of which the following is a description, reference being had to the accompanying drawings, which are a part of this specification.

In that form of malt-house now in use in which properly-attemperated air is passed downwardly through a large quantity of malt on a long malting-floor and this air is thereafter conducted in a passage-way or space under the floor to a flue at one end thereof an undesirable heating of a portion of the malting-floor and malt thereon is caused by the radiation of heat from the accumulated or more rapidly moving air while traversing the passage under the malting-floor. In such malt-house the volume of air that passes downwardly through the perforated floor of a malting-compartment and moves toward and into the discharging-flue acquires more and more heat and moves more and more rapidly as it progresses toward the discharging-flue and as a consequence gives off more heat against the malting-floor above it as it advances toward the discharging-flue, thereby considerably and undesirably increasing the temperature of the malt on the malting-floor over that part of the air-passage toward the end of the floor adjacent to the discharging-flue.

The object of this invention is chiefly to provide means for overcoming this undesirable action of the heated air under the malting-floor.

The invention consists of the devices and their combinations, as herein described and claimed, or the equivalents thereof.

Figure 1:
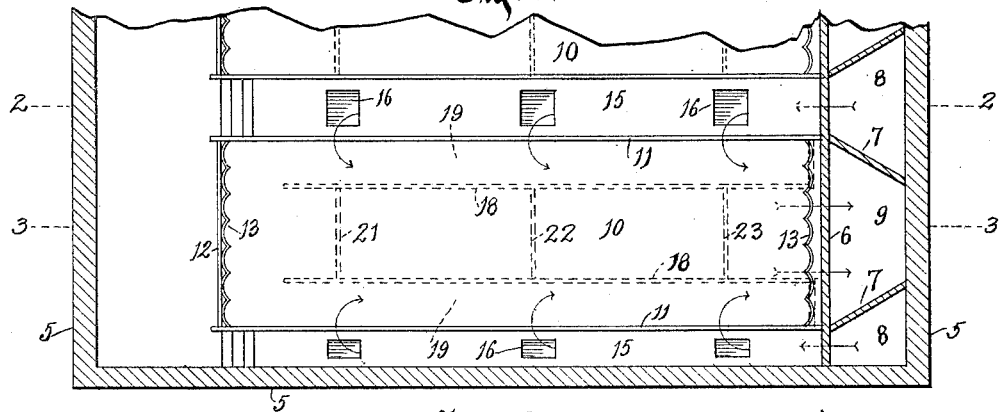
Figure 2:
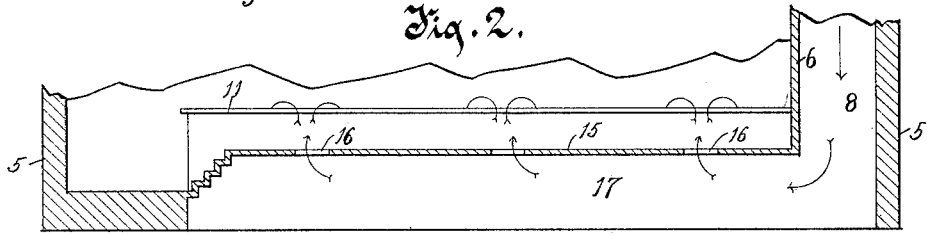
Figure 3:
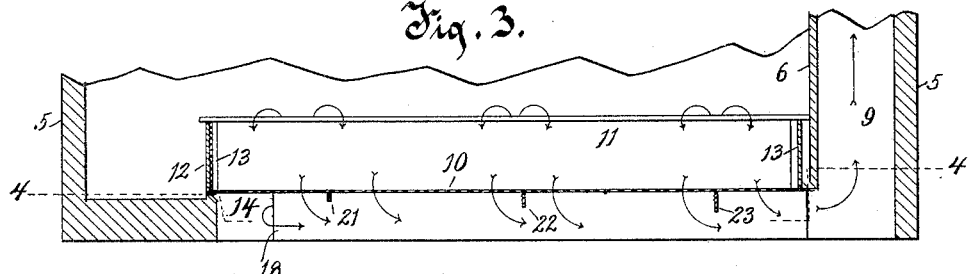
Figure 4:
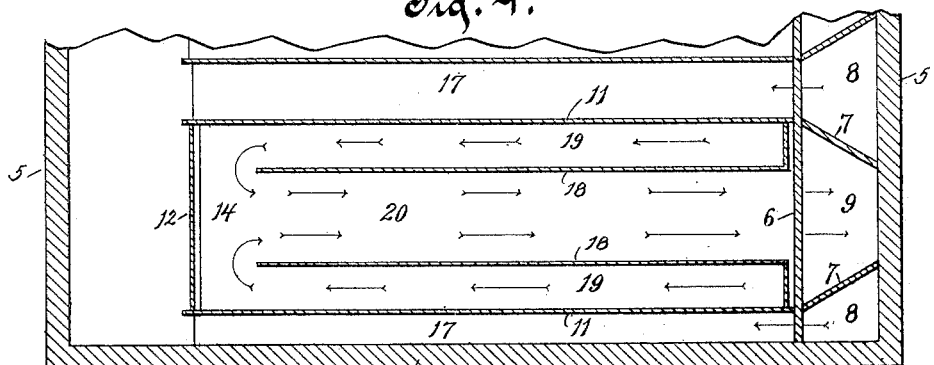

In the drawings, Figure 1 is a horizontal section of a fragment of a malt-house of the general style and character of the malt-house shown in Patent No. 532,544, issued to me on January 15, 1895, the horizontal section being through a malting-room and above a malting-compartment, so that the malting-compartment is shown in plan. Fig. 2 is a vertical section on line 2 2 of Fig. 1. Fig. 3 is a vertical section on line 3 3 of Fig. 1. Fig. 4 is a horizontal section on the diverted line 4 4 of Fig. 3.

In the drawings, 5 5 are the walls of the malt-house. 6 is a partition-wall at a distance from the side of the malt-house. 7 7 are flue-walls preferably in oblique positions across the space from the adjacent side wall 5 to the partition-wall 6. This construction provides the air-supplying flues 8 8 and the exhaust-air flue 9. At a distance above the floor of the malt-house there are malt-compartment floors 10 10, and rising above the compartment-floors, at each side thereof, are low compartment-walls 11 11. At one end the wall 6 is the compartment-wall, and at the other end a wall 12 is the end wall of the compartment. Adjacent to the walls 6 and 12, respectively, are located the inner end walls 13 13 of the compartment, these end walls being formed in a series of vertically-disposed curved sections, (in cross-section,) the construction being adapted to permit of a gang of circular revolving stirrers coming close up to these walls during their travel back and forth over the floor and while stirring the malt. The compartment-floors 10 are perforated, and beneath them there is a space adapted to serve as an air-passage 14, which at one end of the compartment is open into the air-discharging flue 9. It will be understood that this construction provides for the passage of air downwardly through malt on the compartment malting-floor, through the floor, along the air-passage 14, and out through the flue 9. These compartment-floors are located at a little distance from each other, and those at the sides of the building are located at a little distance from the side walls, and the spaces between the side walls of the building and between the several compartments are covered by a gangway-floor 15, provided at intervals with apertures 16 for the passage of air upwardly therethrough. The construction provides the air-supplying passages 17 17, open from the flues 8, into and through which passages air is drawn from the flues and from which passages it is discharged into the malting-room through the aperture 16, and thence it distributes itself in the room, going over the compartment-walls 11 and down through the malt and malting-floor, as before described.

The construction as thus specifically described is already in use in malt-houses, and in using the construction of this general character the undesirable heating of the malt on the malting-floors 10, especially that part of the malt that is on that portion of the floor distant from the wall 12 and nearer to the flue 9. This appears to be caused by the increased radiation of heat from the air in passage 14 as it accumulates from passing through the floor 10 and moves more and more rapidly toward the discharging-flue 9. It will be understood that the heat in the malt is taken up and carried off by the air as it passes through it downwardly, and it is this excess of heat in the air in the passage 14 that undesirably heats the malt on the compartment-floor, especially that portion thereof that is at a distance from the end of the compartment adjacent to the wall 12. For obviating this difficulty I place partial dividing-walls 18 18 in the space below the compartment-floor, these dividing-walls 18 extending from the floor of the building to the compartment-floor 10, thus constructing initial side air-passages 19 19, open at their rear ends into the central passage 20, which is open at its front end into the discharging-flue 9. The construction is such that the air passing downwardly through the compartment-floor 10 adjacent to the respective sides thereof, enters the passages 19, and thence goes to the rear ends of those passages and is there discharged into the central passage 20, through which it is led to the discharging-flue 9. The effect of this is that that portion of the air that passes through the malt and malting-floor into the passages 19 is, with its additional heat, led along under the floor to the rear end thereof and is then discharged into the central passage, the effect being to equalize the heat-supply in the air under the front and rear portions of the malting-compartment, the heat in the air in the passages 19 being somewhat reduced before the air is discharged into the central flue 20 by reason of their proximity to passages 17.

In addition to the partition-walls 18 18, where they are used, I also advisably employ a plurality of transverse wings or dams 21 22 23. These dams are ribs or walls secured to the under surface of the malting-floor 10 and project downwardly therefrom entirely across the passage-way 20, however wide it may be, through which the air, after it has passed through the malting-floor, passes thence to the discharging-flue 9. These dams are preferably of increasing depth from the rear one 21 to the one 23 nearest the discharging-flue. The effect of this is to divert the air on its way through the passage 10 from the under surface of the malting-floor 10 downwardly near to the bottom or floor of the passage 20. The effect of this is to carry the accumulated heat in the air in this passage-way from the malting-floor 10 by causing the current of the moving air to exist chiefly near the bottom of the passage 20.

While I prefer the construction in which the central passage 20 is open to the discharge-flue 9, still the same results in a general way could be obtained by closing the central passage 20 at the discharging-flue 9 and opening the passages 19 into the flue 9, thus providing for using the central passage 20 as the initial passage and the passages 19 19 as the succeeding passages.

What I claim as my invention is—

1. In combination in a malt-house, a perforated malting-floor, means for introducing air into the malt-house above the malting-floor, means dividing the inclosed space immediately under the malting-floor into an initial passage extending in one direction and a succeeding passage alongside the initial passage and continuous thereof in the reverse direction and at its distant end opening into a discharging-flue.

2. In combination in a malt-house, a perforated malting-floor, means for introducing air above the floor, means dividing the inclosed space under the malting-floor into side passages and a central passage, the side passages being open at the rear end into the central passage and the central passage being open at its front end into a discharging-flue.

3. In a malt-house provided with a perforated malting-floor, means inclosing the space below the malting-floor into an air-passage, and wings or dams on the under surface of the perforated malting-floor projecting into the air-passage adapted to divert the passing air from the surface of the malting-floor.

4. In combination in a malt-house, a perforated malting-floor, means inclosing the space under the perforated floor, partial walls 18 dividing the inclosed space into a central passage and passages at the sides open at their rear ends into the central passage, and dams on the under surface of the malting-floor projecting into the central passage under the floor.

In testimony whereof I affix my signature in presence of two witnesses.

JOHN F. DORNFELD.

Witnesses:
C. T. BENEDICT,
ANNA V. FAUST.